United States Patent Office 2,850,509
Patented Sept. 2, 1958

2,850,509

AMIDES OF 9,12-DIKETOSTEARIC ACID; 9,12-DIKETO-10,11-OCTADECENOIC ACID; 9,12-DIKETO-10,11-DIHYDROXYSTEARIC ACID; AND 9,12 - DIKETO - 10,11 - EPOXYSTEARIC ACID

Joseph Nichols, Princeton, and Edgar S. Schipper, New Brunswick, N. J., assignors to Ethicon, Inc., a corporation of New Jersey No Drawing. Application May 5, 1955
Serial No. 506,353

7 Claims. (Cl. 260—348)

This invention relates to amides of 9,12-diketostearic acid, 9,12-diketo-10,11-octadecenoic acid; 9,12-diketo-10,11-dihydroxystearic acid; and 9,12-diketo-10,11-epoxystearic acid, and more particularly relates to N-dialkylaminoalkyl-9,12-diketostearic acid amides; N-dialkylaminoalkyl-9,12-diketo-10,11-octadecenoic acid amides; N-dialkylaminoalkyl-9,12-diketo-10,11-dihydroxystearic acid amides; and N - dialkylaminoalkyl - 9,12 - diketo - 10,11-epoxystearic acid amides.

U. S. Patent No. 2,623,889, December 30, 1952, discloses the oxidation of 12-ketooleic acid and 12-ketoelaidic acid and esters of the acids with chromic acid to produce a diketooctadecenoic acid, having an empirical formula of $C_{18}H_{30}O_4$ and a melting point of 112° C. to 113° C. The oxidation was carried out by means of excess chromic acid over that required to oxidize a methylene group in the molecule, approximately 400 percent excess being preferred for the best yields. The solvent medium was glacial acetic acid in an amount in excess of that required for a single phase reaction medium and excess free sulfuric acid was also present in an amount of at least about three times as much as required to form chromic acid from the soluble dichromate present in the reaction mixture. It was originally believed that the carbon-carbon double bond in the diketo-octadecenoic acid prepared by the oxidation was in the 9,10 position, but it has been since shown that the position of the carbon double bond is 10,11.

9,12-diketo-10,11-epoxystearic acid and 9,12-diketo-10,11-dihydroxystearic acid may be prepared by the oxidation of 9,12-diketo-10,11-octadecenoic acid with hydrogen peroxide. Oxidation with hydrogen peroxide leading to the production of 9,12-diketo-10,11-epoxystearic acid is conducted in an alkaline medium at a low temperature and is preferably conducted at a temperature not above −5° C. in the presence of magnesium chloride which acts as a catalyst. Oxidation with hydrogen peroxide leading to the production of 9,12-diketo-10,11-dihydroxystearic acid is conducted in a neutral or slightly acidic medium and preferably at a temperature not exceeding 70° C. in the presence of a catalytic amount of osmium tetroxide.

The novel N-dialkylaminoalkyl-9,12-diketostearic acid amides; N - dialkylaminoalkyl - 9,12-diketo-10,11-octadecenoic acid amides, N-dialkylaminoalkyl-9,12-diketo-10,11-dihydroxystearic acid amides, and N-dialkylamino-9,12-diketo-10,11-epoxystearic acid amides of this invention may be prepared by reacting equi-molar amounts of the acid and a lower alkyl chloroformate such as isobutylchloroformate, ethylchloroformate, or proplychloroformate in the presence of an equi-molar amount of a lower aliphatic tertiary amine, an acylalkylcarbonate being the result of the reaction. The reaction is conducted at a temperature below 0° C. and in the presence of an inert solvent such as tetrahydrofuran or toluene. The addition of an amine to the reaction mixture containing the acylalkylcarbonate results in the formation of the desired amide.

The novel amides of this invention have the following general structure:

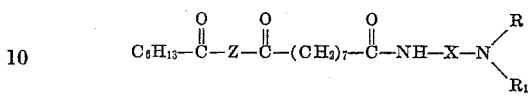

in which Z is an ethylene, vinylene, epoxyethylene, or 1,2-dihydroxy ethylene radical; X is a lower alkylene straight or branched-chain radical and preferably having two or three carbon atoms; and each of R and $R_1$ is a lower alkyl radical and preferably a methyl or ethyl radical.

For the purpose of illustration, the following examples are set forth to illustrate the preparation of the novel compounds of the invention but are not to be construed as limiting the spirit of the invention or its scope.

EXAMPLE I

*N-gamma-dimethylaminopropyl-9,12-diketo-10,11-epoxystearamide*

1.37 grams of isobutylchloroformate were added dropwise to a stirred suspension of 3.26 grams of 9,12-diketo-10,11-epoxystearic acid and 1.02 grams of triethylamine in solution in 200 ml. of tetrahydrofuran, the reaction mixture being maintained at −5° to −10° C. during the addition by means of an alcohol-Dry Ice bath. The reaction mixture was stirred and maintained at −5° C. to −10° C. for thirty minutes after addition had been completed and 1.02 grams of gamma-dimethylaminopropylamine were added. The reaction mixture was refluxed for thirty minutes at which time carbon dioxide was no longer evolved. The precipitate which formed was removed by filtration, the filtrate was evaporated to dryness under reduced pressure and the residue was suspended in 300 ml. of thrice normal hydrochloric acid. The suspension was decolorized with animal charcoal and filtered. The filtrate was neutralized with a concentrated aqueous solution of potassium hydroxide and the precipitate which formed was dried and recrystallized from ethylacetate. 0.5 gram of N-gamma-dimethylaminopropyl-9,12-diketo-10,11-epoxystearamide having a melting point of 82°–83° C. were obtained.

Calculated for $C_{23}H_{42}O_4N_2$:                                Percent
    Carbon _____ 67.28
    Hydrogen _____ 10.31
Found:
    Carbon _____ 66.86
    Hydrogen _____ 10.50

EXAMPLE II

*N-beta-dimethylaminoethyl-9,12-diketostearamide*

2.74 grams of isobutylchloroformate were added dropwise to a stirred solution of 6.24 grams of 9,12-diketostearic acid and 2.04 grams of triethylamine in solution in 200 ml. of tetrahydrofuran, the reaction mixture being maintained at −5° C. to −10° C. by means of an alcohol-Dry Ice bath. The reaction mixture was stirred and maintained at this temperature for thirty minutes after addition had been completed and 1.76 grams of dimethylaminoethylamine were added. The reaction mixture was refluxed for fifteen minutes, at which time carbon dioxide was no longer evolved. The precipitate of triethylamine hydrochloride which formed was removed by filtration and the filtrate was evaporated to dryness under reduced pressure. After the residue had been dissolved in 400 ml. of thrice normal hydrochloric acid the solution was decolorized with animal charcoal and neutralized with a concentrated solution of potassium hydroxide. The precipitate which formed was dried and recrystallized several times from ether and 4.8 grams of N-beta-dimethylaminoethyl-9,12-diketo-stearamide having a melting point of 87°–88° C. were obtained.

Calculated for $C_{22}H_{42}O_3N_2$:  Percent
Carbon _____ 69.06
Hydrogen _____ 11.07
Found:
Carbon _____ 69.43
Hydrogen _____ 11.11

EXAMPLE III

N-gamma-diethylaminopropyl-9,12-diketo-10,11-octadecenoamide 2.74 grams of isobutylchloroformate were added dropwise to a stirred solution of 6.2 grams of 9,12-diketo-10,11-octadecenoic acid and 2.04 grams of triethylamine in solution in 200 ml. of tetrahydrofuran, the reaction mixture being maintained at −5° C. to −10° C. by means of an alcohol Dry Ice bath. The reaction mixture was stirred and maintained at this temperature for thirty minutes after the addition had been completed and 1.6 grams of gamma-diethylaminoproplyamine were added. The reaction mixture was refluxed for fifteen minutes at which time carbon dioxide was no longer evolved. The precipitate of triethylamine hydrochloride which formed was removed by filtration and the filtrate was evaporated to dryness under reduced pressure. After the residue had been dissolved in 300 ml. of thrice normal hydrochloric acid the solution was decolorized with animal charcoal and the mixture was neutralized with a concentrated solution of potassium hydroxide. The precipitate which formed was dried and recrystallized consecutively from ether and ethyl acetate and 2.6 grams of N-gamma-diethylaminopropyl-9,12-diketo-10,11-octadecenoamide having a melting point of 90°–91° C. were obtained.

Calculated for $C_{25}H_{46}O_3N_2$:  Percent
Carbon _____ 71.04
Hydrogen _____ 10.97
Found:
Carbon _____ 71.43
Hydrogen _____ 10.96

EXAMPLE IV

N-beta-dimethylaminoethyl-9,12-diketo-10,11-dihydroxystearamide 1.37 grams of isobutylchloroformate were added dropwise to a stirred solution of 3.44 grams of 9,12-diketo-10,11-dihydroxystearic acid and 1.02 grams of triethylamine in solution in 100 ml. of tetrahydrofuran, the reaction mixture being maintained at −5° C. to −10° C. by means of an alcohol-Dry Ice bath. The reaction mixture was stirred and maintained at this temperature for thirty minutes after the addition had been completed and a hot solution of 0.88 gram of dimethylaminoethylamine in 50 ml. of tetrahydrofuran were added. The mixture was refluxed for thirty minutes at which time carbon dioxide was no longer evolved. The precipitate of triethylamine hydrochloride which formed was removed by filtration and the filtrate was evaporated to dryness under reduced pressure. After the residue had been dissolved in 300 ml. of thrice normal hydrochloric acid the solution was decolorized with animal charcoal and the mixture was neutralized with a concentrated solution of potassium hydroxide. The precipitate which formed was dried and recrystallized several times from ether and 3.5 grams of N-beta-dimethylaminoethyl-9,12-diketo-10,11-dihydroxystearamide having a melting point of 82°–84° C. were obtained.

Calculated for $C_{22}H_{42}O_5N_2$:  Percent
Carbon _____ 63.73
Hydrogen _____ 10.21
Found:
Carbon _____ 64.13
Hydrogen _____ 10.40

EXAMPLE V

N-beta-diethylaminoethyl-9,12-diketo-10,11-epoxystearamide 4.11 grams of isobutylchloroformate were added dropwise to a stirred suspension of 9.78 grams of 9,12-diketo-10,11-epoxystearic acid and 3.06 grams of triethylamine in solution in 500 ml. of tetrahydrofuran, the reaction mixture being maintained at −5° C. to −10° C. by means of an alcohol-Dry Ice bath. The reaction mixture was stirred and maintained at −5° to −10° C. for thirty minutes after the addition had been completed, and 3.48 grams of beta-diethylaminoethylamine were added. The mixture was refluxed for fifteen minutes at which time carbon dioxide was no longer evolved. The precipitate of triethylamine hydrochloride which formed was removed by filtration and the filtrate was evaporated to dryness under reduced pressure. The residue was dissolved in one liter of thrice normal hydrochloric acid and the solution was treated with animal charcoal. The solution was filtered and made basic with potassium hydroxide and the precipitate which formed was recrystallized from ether. 4.4 grams of N-beta-diethylaminoethyl - 9,12 - diketo-10,11 - epoxystearamide having a melting point of 84°–85° C. were obtained.

Calculated for $C_{24}H_{44}O_4N_3$:  Percent
Carbon _____ 67.88
Hydrogen _____ 10.44
Found:
Carbon _____ 67.76
Hydrogen _____ 10.45

EXAMPLE VI

N-beta-diethylaminoethyl-9,12-diketo - 10,11 - octadecenoamide 4.11 grams of isobutylchloroformate were added dropwise to a stirred solution of 9.3 grams of 9,12-diketo-10,-11-octadecenoic acid and 3.06 grams of triethylamine in solution in 300 ml. of tetrahydrofuran, the reaction mixture being maintained at −5° to −10° C. by means of an alcohol-Dry Ice bath. The mixture was stirred and maintained at −5° to −10° C. for thirty minutes after the addition had been completed and 3.48 grams of beta-diethylaminoethylamine were added. The mixture was refluxed for fifteen minutes at which time carbon dioxide was no longer evolved. The precipitate of triethylamine hydrochloride which formed was removed by filtration and the filtrate was evaporated to dryness under reduced pressure. The residue was dissolved in 500 ml. of thrice normal hydrochloric acid and the solution was decolorized with animal charcoal, and neutralized with a concentrated solution of potassium hydroxide. The precipitate which formed was dried and recrystallized from ether, and 6.3 grams of N-beta-diethylaminoethyl-9,12-diketo-10,11-octadecenoamide having a melting point of 95°–96° C. were obtained.

Calculated for $C_{24}H_{44}O_3N_2$:  Percent
Carbon _____ 70.54
Hydrogen _____ 10.86
Found:
Carbon _____ 70.54
Hydrogen _____ 10.72

EXAMPLE VII

*N-beta-diethylaminoethyl-9,12-diketostearamide*

1.37 grams of isobutylchloroformate were added dropwise to a stirred solution of 3.12 grams of 9,12-diketostearic acid and 1.02 grams of triethylamine in solution in 100 ml. of tetrahydrofuran, the reaction mixture being maintained at −5° to −10° C. by means of an alcohol-Dry Ice bath. The mixture was stirred and maintained at −5° to −10° C. for thirty minutes after the addition had been completed and 1.16 grams of beta-diethylaminoethylamine were added. The reaction mixture was refluxed for fifteen minutes at which time carbon dioxide was no longer evolved. The precipitate of triethylamine hydrochloride which formed was removed by filtration and the filtrate was evaporated to dryness under reduced pressure. The residue was dissolved in 200 ml. of thrice normal hydrochloric acid and the solution was decolorized with animal charcoal and neutralized with a concentrated solution of potassium hydroxide. The precipitate which formed was dried, then dissolved in 20 ml. of ether, and the ether solution was cooled to −15° C. 1.5 grams of N-beta-diethylaminoethyl-9,12-diketostearamide having a melting point of 88°–89° C. were obtained.

Calculated for $C_{24}H_{46}O_3N_2$:    Percent
  Carbon _____ 70.19
  Hydrogen _____ 11.29
Found:
  Carbon _____ 69.94
  Hydrogen _____ 11.22

EXAMPLE VIII

*N-beta-diethylaminoethyl-9,12-diketo-10,11-dihydroxystearamide*

4.11 grams of isobutylchloroformate were added dropwise to a stirred solution of 10.32 grams of 9,12-diketo-10,11-dihydroxystearic acid and 3.06 grams of triethylamine in solution in 300 ml. of tetrahydrofuran, the reaction mixture being maintained at −5° C. to −10° C. by means of an alcohol-Dry Ice bath. The mixture was stirred and maintained at −5° C. to −10° C. for thirty minutes after the addition had been completed and 3.48 grams of beta-diethylaminoethylamine were added. The mixture was refluxed for fifteen minutes at which time carbon dioxide was no longer evolved. The precipitate of triethylamine hydrochloride which formed was removed by filtration and the filtrate was evaporated to dryness under reduced pressure. The residue was dissolved in 500 ml. of thrice normal hydrochloric acid and the solution was decolorized with animal charcoal, filtered, and then neutralized with a concentrated solution of potassium hydroxide. The precipitate which formed was dried and recrystallized twice from ether. 6.8 grams of N-beta-diethylaminoethyl-9,12-diketo-10,11-dihydroxystearamide having a melting point of 72°–74° C. were obtained.

Calculated for $C_{24}H_{46}O_5N_2$:    Percent
  Carbon _____ 70.71
  Hydrogen _____ 11.39
Found:
  Carbon _____ 70.50
  Hydrogen _____ 11.30

The novel compounds of this invention are highly effective at low concentration in killing microorganisms or preventing or inhibiting their growth.

EXAMPLE IX

N-beta-dimethylaminoethyl-9,12-diketostearamide, N-gamma-diethylaminopropyl-9,12-diketo-10,11-octadecenoamide, N-beta-diethylaminoethyl-9,12-diketo-10,11-epoxystearamide, N-beta-diethylaminoethyl-9,12-diketo-10,11-octadecenoamide, N-beta-diethylaminoethyl-9,12-diketostearamide, and N-beta-diethylaminoethyl-9,12-diketo-10,11-dihydroxystearamide were tested for bactericidal activity by the following serial dilution method:

The compounds were sterilized by exposure to propylene oxide for three days and 0.5 milliliter of sterile aqueous solution containing twenty micrograms of compound per milliliter of solution was added to 9.5 milliliters of sterile yeast beef broth, the broth then being serially diluted with additional sterile broth to provide solutions of five milliliters total volume containing 500, 200, 100, 50, 10, 1, 0.1, and 0.01 micrograms of compound per milliliter of solution. Four tubes, each containing 4.5 milliliters of sterile broth, were inoculated with 0.1 milliliter of a mature broth culture of *Bacillus subtilis*, *Diplococcus pneumoniae* III and *Micrococcus pyogenes* var. *aureous* respectively, and the inoculated tubes were incubated at 37° C. for 24 hours. Four tubes, each containing 4.5 milliliters of sterile broth were each inoculated with 0.1 milliliter of an incubated culture and incubated at 37° C. for 24 hours. Progressive series of dilutions ranging from 1 to 100, to 1 to 1 billion, were prepared by dilution of the contents of the four tubes with sterile broth and 0.1 milliliter of each dilution was transferred into 4.5 milliliters of sterile broth and incubated at 37° C. for 24 hours. 0.1 milliliter of the contents of the tubes representing the highest dilution which initiated growth of the organisms were each transferred into each of the tubes containing the compounds to be tested and this was followed by incubation of the tubes at 37° C. for 48 hours. The table below gives the results of the tests by serial dilution in column I, the values being the concentrations in micrograms per milliliter at which growth was inhibited.

N-beta-dimethylaminoethyl-9,12-diketostearamide, N-gamma-diethylaminopropyl-9,12-diketo-10,11-octadecenoamide, N-beta-diethylaminoethyl-9,12-diketo-10,11-epoxystearamide, N-beta-diethylaminoethyl-9,12-diketo-10,11-octadecenoamide, N-beta-diethylaminoethyl-9,12-diketostearamide, and N-beta-diethylaminoethyl-9,12-diketo-10,11-dihydroxystearamide were tested for activity against *Mycobacteria tuberculosis* H37Rv according to the method of A. W. Frisch and M. S. Tarshis, American Review of Tuberculosis, vol. 64, page 551 (1951). The table below gives the results of the activity of the novel compounds against *Mycobacteria tuberculosis* H37Rv in column II, inhibiting concentrations being expressed in micrograms per milliliter.

N-beta-dimethylaminoethyl-9,12-diketostearamide, N-gamma-diethylaminopropyl-9,12-diketo-10,11-octadecenoamide, N-beta-diethylaminoethyl-9,12-diketo-10,11-epoxystearamide, N-beta-diethylaminoethyl-9,12-diketo-10,11-octadecenoamide, N-beta-diethylaminoethyl-9,12-diketostearamide, and N-beta-diethylaminoethyl-9,12-diketo-10,11-dihydroxystearamide were tested for activity against *Coccidioides immitis* by a serial dilution method given by the following procedure:

The compounds were sterilized by exposure to propylene oxide for three days and 0.25 milliliter of sterile aqueous solution containing twenty micrograms of compound per milliliter of solution was added to 4.5 milliliters of sterile Mycophil broth, the broth then being serially diluted with additional sterile broth to provide solutions of five milliliters total volume containing 500, 100, 10, 1, 0.1, and 0.01 micrograms of compound per milliliter of solution. One milliliter of a seventy-two hour Mycophil broth culture of *Cryptococcus neoformans* was added to ninety-nine milliliters of sterile Mycophil broth and 0.2 milliliter of diluted culture was added to each of the serial dilutions containing the test compound and the inoculated tubes were incubated at 25° C. for five days. The Table below gives the results of the tests in column III, inhibiting concentrations being expressed in micrograms per milliliter:

TABLE

| | Column I Bacterial inhibiting activity | | | Column II Mycobacterial inhibiting concentration—Mycobacterium tuberculosis H37Rv | Column III Fungal inhibiting concentration—Cryptococcus neoformans |
| --- | --- | --- | --- | --- | --- |
| | D. subtilis | D. pneumoniae III | M. pyogenes var. aureus | | |
| N-beta-dimethyl-aminoethyl-9,12-diketostearamide | | | | 100 | 100 |
| N-gamma-diethyl-aminopropyl-9,12-diketo-10,11-octadecenoamide | 10 | 10 | 10 | 100 | 10 |
| N-beta-diethyl-aminoethyl-9,12-diketo-10,11-epoxystearamide | 100 | 50 | 50 | 25 | 500 |
| N-beta-diethyl-aminoethyl-9,12-diketo-10,11-octadecenoamide | 10 | 10 | 10 | 10 | 10 |
| N-beta-diethyl-aminoethyl-9,12-diketostearamide | 200 | 200 | 200 | 100 | 500 |
| N-beta-diethyl-aminoethyl-9,12-diketo-10,11-dihydroxystearamide | 500 | 200 | 200 | | |

What is claimed is:

1. New and useful compounds having the formula:

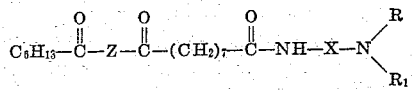

in which X is a lower alkylene radical, R and $R_1$ are each a lower alkyl radical, and Z is a radical selected from the class consisting of ethylene, vinylene, epoxyethylene and 1,2-dihydroxy ethylene radicals.

2. New and useful compounds according to claim 1 in which X is a lower alkylene radical having at least two but not more than three carbon atoms and R and $R_1$ are each an alkyl radical having not more than two carbon atoms.

3. N-gamma - dimethylaminopropyl-9,12-diketo-10,11-epoxystearamide.

4. N-beta-dimethylaminoethyl-9,12-diketostearamide.

5. N - gamma - diethylaminopropyl-9,12-diketo-10,11-octadecenoamide.

6. N - beta - dimethylaminoethyl-9,12-diketo-10,11-dihydroxystearamide.

7. N - beta - diethylaminoethyl - 9,12-diketo-10,11-epoxystearamide.

References Cited in the file of this patent

UNITED STATES PATENTS

| | | |
| --- | --- | --- |
| 1,534,525 | Hartmann et al. | Apr. 21, 1925 |
| 2,430,004 | De Groote et al. | Nov. 4, 1947 |
| 2,623,889 | Nichols | Dec. 30, 1952 |
| 2,626,876 | Carnes | Jan. 27, 1953 |
| 2,652,356 | Hanson et al. | Sept. 15, 1953 |
| 2,703,328 | Celmer | Mar. 1, 1955 |

OTHER REFERENCES

Vaughan: J. Am. Chem. Soc., vol. 73 (1951), page 3547.

Emery et al.: J. Am. Chem. Soc. (1950), pages 1443–1460.

Squibb Abst. Bull. 23: 7, page A–168, Feb. 15, 1950.

Journal of American Pharm. Assn., Science Ed., September 1950, pages 468–489.

Chem. Abst., vol. 40, 3795[6, 7], 1946.